June 23, 1964 L. R. McCREIGHT 3,138,009
TRANSPIRATION COOLING SYSTEM
Filed April 17, 1957
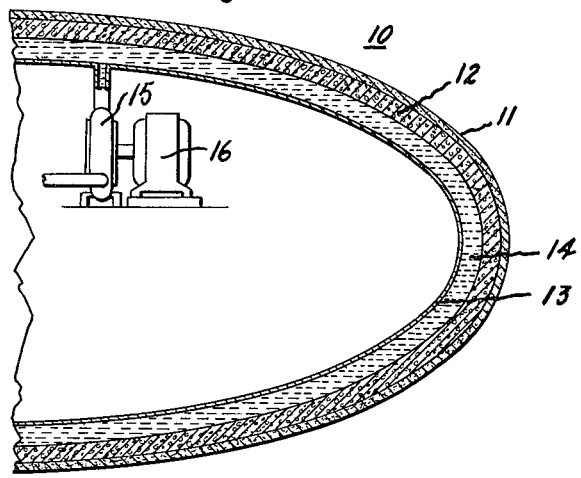
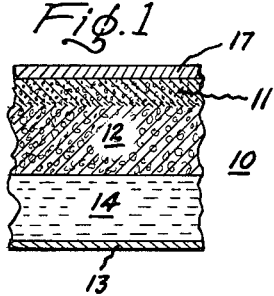
Inventor
Louis R. McCreight
by Alfred B. Levine
His Attorney

United States Patent Office 3,138,009
Patented June 23, 1964

3,138,009
TRANSPIRATION COOLING SYSTEM
Louis R. McCreight, Strafford, Pa., assignor to General
Electric Company, a corporation of New York
Filed Apr. 17, 1957, Ser. No. 653,376
2 Claims. (Cl. 62—315)

This invention generally relates to heat resistant structures and cooling means therefor finding particular utility for use in high speed aircraft body structures such as missiles.

As an aircraft body exceeds supersonic speed and approaches and assumes hypersonic speed, generally defined as speeds in excess of Mach 5, it encounters what has been termed the "heat barrier" which is a complex atmospheric condition wherein considerable heat conditions are imposed upon the craft sufficient to rapidly melt, and/or vaporize most known materials at an extremely rapid rate in a manner similar to the burning and destruction of meteors. To enable such a craft to survive this thermal barrier, it must absorb or dissipate this heat while maintaining its structural strength. One conventional solution to this heating problem is to employ high melting point or burning temperature materials in sufficient thicknesses that despite progressive erosion of the body from its outer surface inwardly, a portion of the body remains after a limited time exposure to this environment in a manner similar to the survival of small portions of large meteors that pass through the atmosphere. Still another conventional solution is the use of relatively large bodies of highly conductive material operating as a large heat sink. However, these possible solutions are somewhat unsatisfactory both in failing to survive some extremely severe temperature environments or in requiring the structure to be of such bulk, thickness, and weight as to be unsatisfactory and, in fact, prohibitive for certain applications. Similarly, in many applications such as rocket engines, turbine blades, and other mechanical, chemical, and electrical uses, great heating and erosion environments are encountered placing progressively greater demands that are not satisfied by known materials.

In accordance with the present invention, there is provided a unique structure comprised of bonded layers of porous material with the different layers having different degrees of porosity, together with means for the pressurized forcing of a fluid through the pores of this material to its surface so as to vaporize at the surface and thereby provide cooling. To reduce the resistance of the structure to fluid flow while maintaining a controlled flow to the surface portion, the outer layer of material is preferably both thinner and less porous than the inner layers to prevent too rapid escape of the fluid, whereas the inner layer is preferably made thicker and more porous to strengthen the overall structure without introducing undue resistance to the fluid flow.

It is accordingly one object of the present invention to provide a structure and cooling system for withstanding great heat and erosive heating environments.

A further object is to provide such a structure and system that is relatively lightweight and strong at elevated temperatures.

Other objects and many attendant advantages of this invention will be more readily comprehended by those skilled in the art upon a detailed consideration of the following specifications taken with the accompanying drawings wherin:

FIG. 1 is an enlarged cross-sctional view depicting a structure in accordance with one preferred embodiment of the invention, and FIG. 2 is a cross-sectional view depicting the forward portion of an aircraft body employing the structure of FIG. 1.

Referring now to FIGS. 1 and 2 for a more detailed consideration of one preferred embodiment of the invention, there is shown a member 10, such as the forward portion of an aircraft body, comprised of an outer structural layer of relatively thin porous material 11, an underlayer of thicker and more porous material 12, and a sealed reservoir 13 about the inside of layer 12 containing a fluid 14, such as water, under pressure. With this arrangement both capillary action and fluid pressure force fluid 14 through the coarse pores of inner layer 12 and thence through the finer pores of our layer 11 to appear as water droplets or water vapor covering the outside surface of member 10. As this member is subjected to heat, the water is continuously forced outward through the pores of the layers to replace the water droplets or vapor over the surface that are continuously being vaporized about the member. As is known to those skilled in the art, the vaporization of water absorbs considerable heat from the body and the continuous vaporization or "perspiration" of the fluid over the surface of the body enables the member to survive considerably greater heating environments than would be otherwise possible without such cooling.

As is believed evident to those skilled in the art, the effective cooling or heat absorption of which the system is inherently capable depends upon the weight of fluid which can be continuously vaporized and carried away from the member in each unit interval of time as well as the uniform control of transpiration cooling about the outer surface of body 10 to eliminate undesirable hot spots and the like over the body's surface which might possibly heat too rapidly. These factors, in turn, depend upon the size of the porous opening through the structure, the reservoir pressure forcing the fluid through the openings, and the conducting away of the vapor from the surface to be cooled to enable new vapor to be generated, and the like.

For applications of this material to aircraft body structures adapted to travel at hypersonic speeds through the atmosphere and withstand temperatures greater than 1,500° Kelvin, it is preferred that the outer layer 11 be rather uniformly provided with numerous fine pores of about 40 to 80 microns in size. Such a layer may be formed by compacting particles or grains of high temperature resistant metal or the like, such as stainless steel, of sizes between 200 to 235 mesh, and sintering these compacted particles together by using standard well known powdered metallurgical techniques. The inner, more porous layer 12 may also be made of stainless steel or similar metal grains and made more porous than the outer layer by using individual particles larger than 150 mesh to provide coarser pores of about 100 to 200 microns in size. To reduce the weight of the overall member but provide sufficient strength, it is preferred that the outer layer be approximately $1/16''$ thick and the inner layer $3/16''$ thick or greater for some missile applications, however, these thicknesses may be varied as desired to meet the requirements of a particular application.

Fluid 14 may be pressurized by a pump 15, driven by a motor 16 or the like, as shown, to provide greater fluid pressure within the reservoir than that outside of member 10. Other means for pressurizing fluid 14, such as a pressure tank (not shown) may, of course, be used and other fluids such as introgen or other gas may be stored under pressure in liquid form, if desired.

With this arrangement, as generally discussed above, it is noted that the outer layer 11 is preferably about $1/3$ of the thickness of the inner layer 12 for the purpose of reducing the resistance to the flow of the fluid 14 and consequently greatly lessening the fluid pressure needed to force the fluid through the fine outer pores. Additionally, the small and numerous pores through outer layer 11 enable many more tiny particles of fluid to be formed near the surface and facilitate the more complete coverage of the surface and vaporization of the fluid particles. On the other hand, the much thicker inner layer 12 having much larger pores than the outer layer, provides less resistance to the flow of fluid while at the same time strengthening the overall structure.

The employment of two sintered layers of porous metal provides a more superior structure than if the body were made of a single layer of powdered material of one size; since if a coarse powder were used throughout, the amount of fluid needed for cooling would be excessive and a greater reservoir would be needed to store a sufficient amount of this fluid. On the other hand, if the complete structure were made of finely powdered material and fine pores were used throughout, the pressure drop or resistance to fluid flow would be much greater, requiring a much larger pump and greater pressure in the reservoir. Additionally, using fine pores throughout and making the structure thick enough to meet structural requirements greatly increases the possibility of the fine pores clogging and the likelihood of "hot spots" developing over the surface of the member 10 resulting in the rapid destruction and burning of the member in those portions, or if such fine pore material were used in a layer that was thin enough to minimize this pressure drop and plugging problem, the member would be usually too thin to have adequate structural strength.

It is believed evident to those skilled in the art that powdered materials other than stainless steel may be used, such as copper or alloys thereof, refractory metals or alloys thereof, or ceramic particles such as alumina, and others having sufficiently high melting point and the characteristic of retaining strength at elevated temperatures. Similarly, other cooling fluids may also be used such as helium, hydrogen or the like, with substantially the same or different cooling result depending upon the cooling needed and other factors determining the detailed design of a particular structure.

Should this structure and cooling system be used for hypersonic aircraft, it may be desirable to provide a thin protective coating 17 of a corrosion resistant material over the outside surface of the member 10 (FIG. 1) to protect this surface against oxidation and corrosion during the lower speed take-off and ascent portions of the flight. This coating 17 initially seals the pores in outer layer 11 and prevents the escape of fluid 14 prior to the time when transpiration cooling is necessary and additionally protects the steel or other porous metal layer 11 from the effect of oxidation and corrosion by the atmosphere. As the craft reaches higher and higher speeds and the temperature precipitously increases, coating 17 is burned away to expose the porous layer underneath and permit the transpiration cooling of the system as described above. For this purpose, a coating 17 of a suitable plastic, ceramic, or a corrosion resistant metal such as stainless steel, or the like may be applied and lightly bonded over the outer surface 11 of the member.

Although but one preferred application of the invention together with preferred thicknesses and materials have been described in accordance with the patent laws, it is believed evident to those skilled in the art that many structural variations may be made in applying this invention to other applications and environments without departing from the spirit and scope of this invention. Accordingly, this invention is to be considered as being limited only by the following claims hereto:

What is claimed is:

1. A transpiration cooled skin structure comprising a plurality of layers of porous material, each of said layers having a substantially uniform porosity throughout its cross-section, a fluid reservoir backing up said layers with a fluid under pressure, the porosity and thickness of said layers decreasing from the inside out such that the innermost of said layers is designed primarily for structural support and to require minimized pressure from said reservoir to force said fluid therethrough and the outermost of said layers is designed to provide smaller and more numerous porous openings to control the rate of fluid transpiration therethrough.

2. A transpiration cooled skin structure comprising means for preventing loss of cooling fluid during the low velocity portion of a flight consisting of an outer thin protective coating of non-porous corrosion-resistant material, means for limiting the rate of fluid transpiration consisting of a second intermediate layer of porous material of relatively fine grain, means for providing structural strength consisting of a third inner layer of porous material of relatively coarse grain and reservoir means for backing up said aforementioned layers with a fluid under pressure which will transpire through said intermediate and inner layers when said outer layer burns away, said inner layer being of sufficient porosity such that the pressure requirements of said reservoir means are minimized and of sufficient thickness to provide structural strength.

References Cited in the file of this patent
UNITED STATES PATENTS

| | | |
|---|---|---|
| 573,120 | Wheleer | Dec. 15, 1894 |
| 2,267,918 | Hildabolt | Dec. 30, 1941 |
| 2,447,200 | Miller | Aug. 17, 1948 |
| 2,468,820 | Goddard | May 3, 1949 |
| 2,843,341 | Dannenberg et al. | July 15, 1958 |
| 2,908,455 | Hoadley | Oct. 13, 1959 |
| 2,941,759 | Rice | June 21, 1960 |